(12) United States Patent
Kim et al.

(10) Patent No.: US 8,955,000 B2
(45) Date of Patent: Feb. 10, 2015

(54) DISC DRIVE AND A HOUSING THEREOF INCLUDING PENETRATION HOLE

(75) Inventors: Sang-hun Kim, Suwon-si (KR);
Jung-hwan Na, Hwaseong-si (KR);
Sang-hum Cho, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/295,617

(22) Filed: Nov. 14, 2011

(65) Prior Publication Data

US 2012/0174127 A1 Jul. 5, 2012

(30) Foreign Application Priority Data

Dec. 30, 2010 (KR) ........................ 10-2010-0139348

(51) Int. Cl.
*G11B 17/056* (2006.01)
*G11B 33/14* (2006.01)
*G11B 33/12* (2006.01)

(52) U.S. Cl.
CPC ............ *G11B 17/056* (2013.01); *G11B 33/122* (2013.01)
USPC .......................................... 720/650; 720/601

(58) Field of Classification Search
CPC ............. G11B 17/056; G11B 17/0565; G11B 33/12–33/124
USPC ................. 720/600, 601, 648–653, 671, 672, 720/676–680
See application file for complete search history.

(56) References Cited

U.S. PATENT DOCUMENTS

| | | | | |
|---|---|---|---|---|
| 7,451,465 B2 * | 11/2008 | Hayashi et al. | ............... | 720/675 |
| 2004/0205785 A1 * | 10/2004 | Takahashi et al. | ............ | 720/601 |
| 2006/0041897 A1 | 2/2006 | Takahashi et al. | | |
| 2006/0123438 A1 * | 6/2006 | Toyama et al. | ............... | 720/674 |
| 2006/0161940 A1 * | 7/2006 | Arai et al. | ..................... | 720/685 |
| 2012/0072928 A1 * | 3/2012 | Ou et al. | ....................... | 720/613 |

FOREIGN PATENT DOCUMENTS

| | | |
|---|---|---|
| JP | 2004-022005 | 1/2004 |
| JP | 2008-165949 | 7/2008 |
| KR | 10-2004-0042254 | 5/2004 |
| KR | 10-2004-0046653 | 6/2004 |
| KR | 100844534 B1 * | 7/2008 |

OTHER PUBLICATIONS

English translation of KR 100844534 B1.*

* cited by examiner

*Primary Examiner* — Nathan Danielsen
(74) *Attorney, Agent, or Firm* — NSIP Law

(57) ABSTRACT

A disc drive that includes: a housing configured to receive a tray, a pickup mounted on the tray; a connector installed on the housing for outputting signals obtained from the optical pickup; a ribbon cable that includes a first end which is connected to the connector, including a plurality of wire layers, and a part installed adjacent to a side of a body of the housing; and at least one penetration hole formed in a side of the body of the housing so as to reduce a capacitive coupling between the ribbon cable and the body of the housing.

23 Claims, 7 Drawing Sheets

DISC DRIVE AND A HOUSING THEREOF INCLUDING PENETRATION HOLE

CROSS-REFERENCE TO RELATED PATENT APPLICATION

This application claims the benefit of Korean Patent Application No. 10-2010-0139348, filed on Dec. 30, 2010, in the Korean Intellectual Property Office, the entire disclosure of which is incorporated herein in by reference for all purposes.

BACKGROUND

1. Field

The following description relates to a housing for an optical disc drive and a drive adopting the housing, and additionally, to a structure for preventing a capacitive coupling between a cable and a housing.

2. Description of the Related Art

In general, a slim type optical disc drive used in laptop computers includes a housing (or main body) that receives a tray on which an optical pickup is installed. The tray receives a disc from which data is read or to which data is recorded. The optical disc drive also includes a main printed circuit board (PCB) that controls the optical pickup. Because the optical disc drive has to be designed so as to be suitable for a predetermined standard that maintains compatibility between general laptop computers, and there is a limitation in designing the optical disc drives. According to a conventional optical disc drive structure, the tray has mounted thereon an optical pickup, and a main PCB. The optical pickup has a main body that is mounted on a metal base having a guide shaft installed thereon such that the optical pickup is to enable the optical pickup to reciprocate with respect to the metal base. Conventional optical disc drives tend to experience capacitive coupling between the metal base and a ribbon cable installed in the optical pickup. Such capacitive coupling may cause interference or distortion of signals.

SUMMARY

In one general aspect, a disc drive is provided. The disc drive includes a housing configured to receive a tray, a pickup that is operatively coupled to the tray, a connector installed on the housing configured to output signals obtained from the pickup, a cable, comprising a first end which is connected to the connector, and a part installed adjacent to a side of a body of the housing, and at least one penetration hole formed in a side of the body of the housing so as to reduce a capacitive coupling between the cable and the body of the housing.

A main printed circuit board (PCB) may be installed on the tray, and the cable comprises a second end which is connected to the main PCB.

Guide shafts, on which the pickup is installed to reciprocate, may be installed on the tray, and supporting posts configured to support the guide shafts may protrude from the tray.

Guide shafts, on which the optical pickup is installed to reciprocate, may be installed on the tray, and supporting posts configured to support the guide shafts protrude from the tray.

A plurality of the penetration holes may be formed along a certain wire layer included in the cable.

The cable may comprise a fixed portion and a movable portion that is bent from the fixed portion, and the movable portion may partially overlap the fixed portion such that the movable portion is not parallel with the fixed portion.

The cable may comprise a fixed portion and a movable portion that is bent from the fixed portion, and the movable portion may partially overlap the fixed portion such that the movable portion is not parallel with the fixed portion.

The movable portion may be disposed in parallel with a direction in which the tray moves.

The cable may be a ribbon cable.

An electronic device may include the disc drive.

The electronic device may be one of a portable game console, a portable/personal multimedia player (PMP), a portable lap-top PC, a desktop PC, a high definition television (HDTV), an optical disc player, and an optical disc recorder.

In another aspect, a disc drive is provided. The disc drive includes a housing comprising a base and a cover, the housing configured to receive a tray, a pickup mounted on the tray, a spindle motor mounted on the tray such that a rotary shaft of the spindle motor is fixed on the tray, a cable installed between the base of the housing and the tray, and at least one penetration hole formed in the base of the housing so as to reduce a capacitive coupling between the cable and the base of the housing.

The cable may include a fixed portion and a movable portion that is bent from the fixed portion; and the fixed portion may be disposed to face the penetration hole.

The movable portion may partially overlap with the fixed portion such that the movable portion is not to parallel with the fixed portion.

The movable portion may be disposed in parallel with a direction in which the tray moves.

An electronic device may include the disc drive.

The electronic device may be one of a portable game console, a portable/personal multimedia player (PMP), a portable lap-top PC, a desktop PC, a high definition television (HDTV), an optical disc player, and an optical disc recorder.

In another aspect, a housing for a disc drive is provided. The housing includes a base to which an disc tray is coupled as a drawer type, a cover configured to protect a disc that is mounted on the disc tray, and at least one penetration hole formed in the base for reducing a capacitive coupling between the cable and the base, the at least one penetration hole being substantially aligned with a cable which is located between the tray and the base.

A connector to which the cable is operatively connected may be formed on the base.

The cable may include a plurality of wire layers, and a plurality of the penetration holes may be formed along a certain wire layer in the cable.

The cable may include a fixed portion and a movable portion bent from the fixed portion, and the fixed portion may be disposed to face the penetration hole.

The cable may include a fixed portion and a movable portion bent from the fixed portion, and the fixed portion may be disposed to face the penetration hole.

The cable may be a ribbon cable.

Other features and aspects may be apparent from the following detailed description, the drawings, and the claims.

Figure 1:
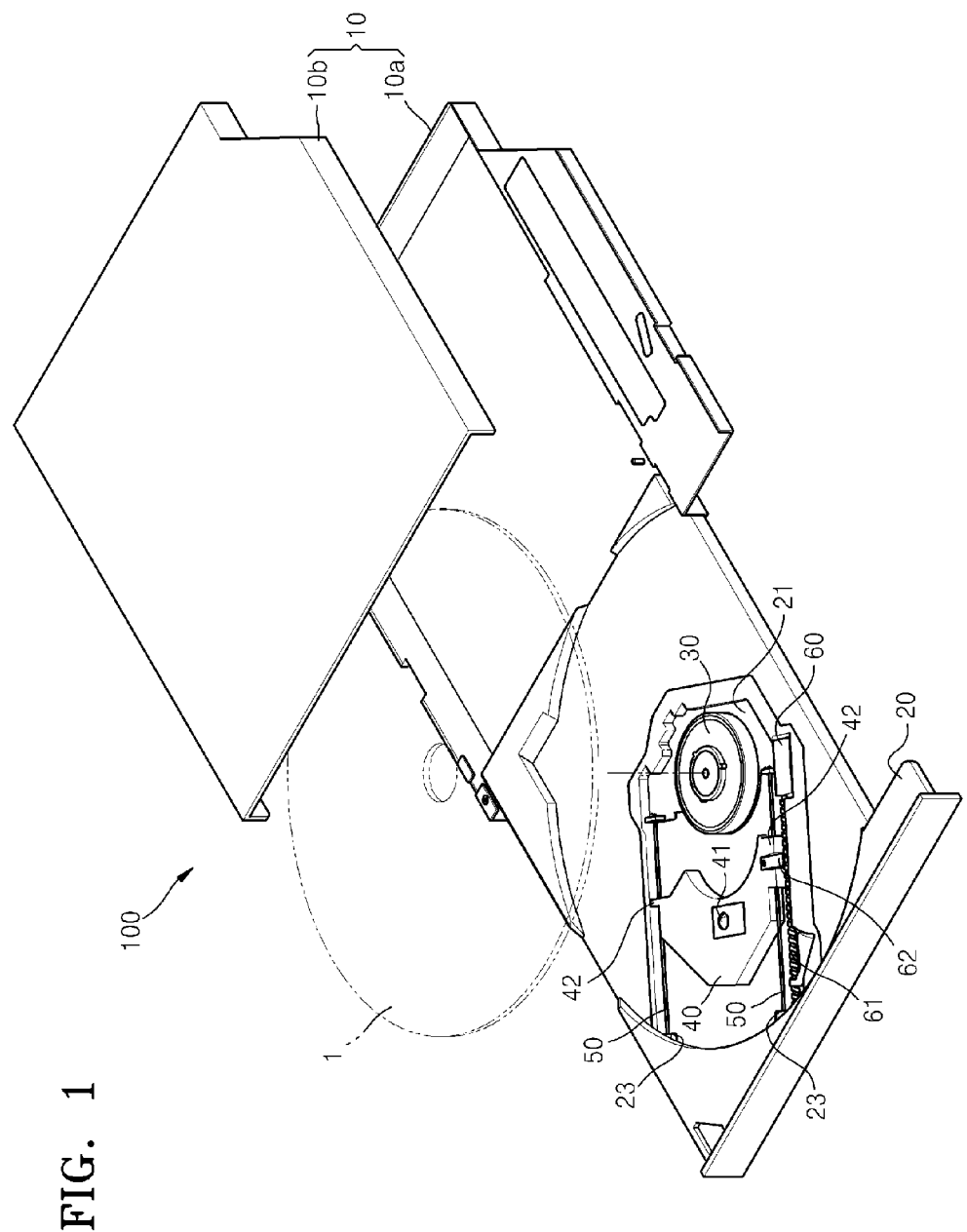
FIG. 1 is a drawing that illustrates an example of a disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram that illustrates an example of a disc drive 100.

Referring to FIG. 1, a tray 20 is operatively coupled to a housing 10 that includes a base 10a and a cover 10b so as to be capable of being positioned in an ejected state in which the tray 20 is accessible to a user through to an inserted state in which the tray 20 is enclosed within the housing 10. The tray 20 may have installed thereon a spindle motor 30 and an optical pickup 40. The spindle motor 30 may have a disc mounted thereon. The optical pickup 40 may be installed on two guide shafts 50 operatively coupled to the tray 20 so as to be parallel with each other. The optical pickup 40 may include an object lens 41, an actuator (not shown) that drives the object lens 41, and guide portions 42 that slide with respect to the guide shafts 50 on both sides of the pickup 40. The tray may also include a conveying motor 60 having a screw 61 that is disposed to make the optical pickup 40 reciprocate along the guide shafts 50. The screw 61 may be engaged with a screw coupling portion 62 that is coupled to the optical pickup 40, and thus, the optical pickup 40 reciprocates along with the guide shafts 50 according to a rotation of the screw 61. For example, the screw may be engaged in tooth contact with the screw coupling portion 62.

The structure of the disc drive will be described in more detail with reference to FIG. 2.

The tray 20 provides a space 22 in which the optical pickup 40 may be installed and moved as the optical pickup 40 reciprocates along the guide shafts 50.

The guide shafts 50 may be disposed on both sides of the space 22 in parallel with each other. Each of the guide shafts has a first end supported by supporting post 23 and a second end supported by supporting post 24. The supporting posts 23 and 24 are disposed on the tray. For example, the supporting posts 23 and 24 may be integrally formed with the tray 20. Two end portions of the optical pickup 40 are supported by the guide shafts 40 via the guide portions 42. The screw coupling portion 62 that engaged with the screw 61 of the conveying motor 60 may be disposed on a side of the optical pickup 40.

Figure 3:
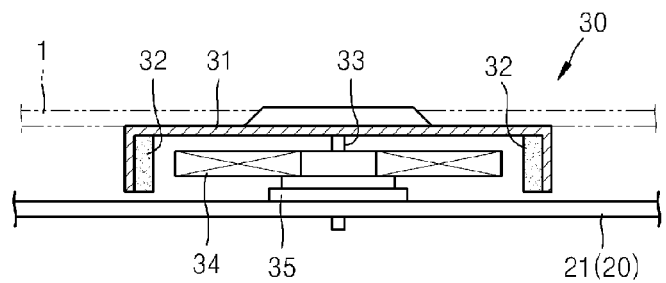
FIG. 3 is a drawing that illustrates an example of a spindle motor directly installed on a tray in a disc drive.

FIG. 3 is a drawing that illustrates an example of a spindle motor directly installed on a tray in a disc drive.

Figure 2:
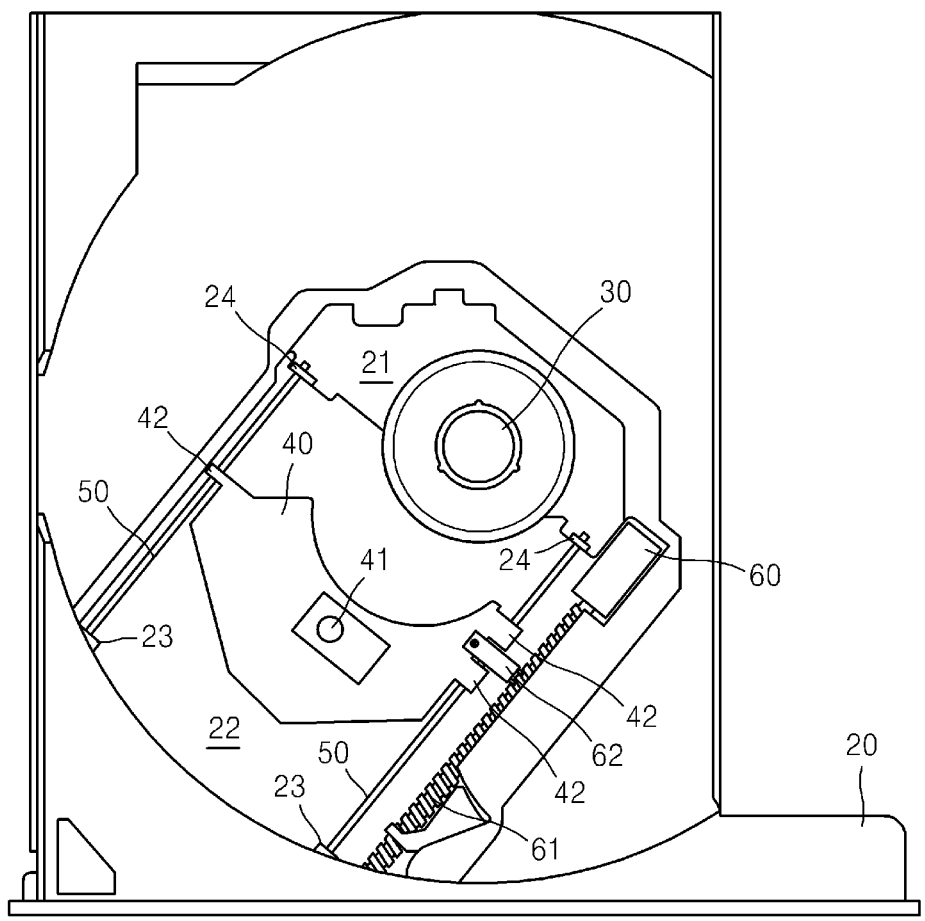
FIG. 2 is a drawing that illustrates an example of a tray for the disc drive illustrated in FIG. 1.

Referring to FIGS. 2 and 3, a motor base 21 functioning as a base of the spindle motor 30 may be disposed on a side of the space 22 in the tray 20. The motor base 21 may be a part of the tray 20, on which a shaft supporting portion 35 having a bearing (not shown) that supports a rotary shaft 33 of the spindle motor 30 may be fixed. A magnetic coil portion 34 that is a stator is fixed on an upper end portion of the shaft supporting portion 35. A rotor 31, on which a disc (not shown) is mounted, may have a permanent magnet 32 disposed therein. The rotary shaft 33 supports the rotor 31 such that a bottom surface of the rotor 31 opposes an upper surface of the magnetic coil portion 34. Based on the above-described example of a disk drive, a part of the tray is used as the motor base. In contrast, conventional disk drives have a motor base that is installed in a conventional spindle motor. Thus, a motor base, which is conventionally installed as part of the conventional motor, is removed, and a part of the tray is used as the motor base.

Figure 4:
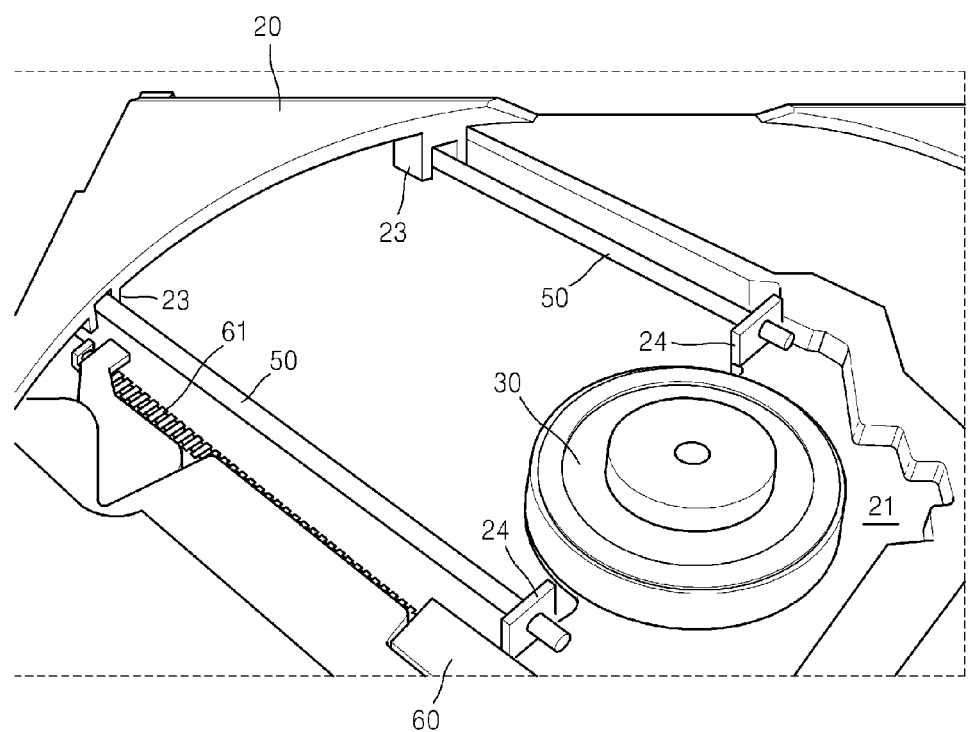
FIG. 4 is a drawing that illustrates an example of a guide shaft and a supporting post supporting the guide shaft in a tray of a disc drive.

FIG. 4 is a diagram that illustrates an example of supporting posts 23 and 24 which support the guide shafts 50 in a disc drive.

Figure 5A:
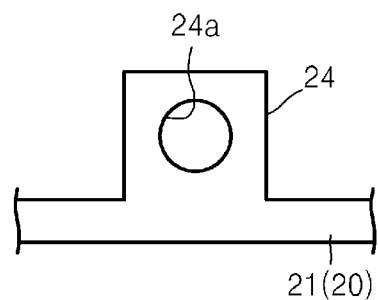
FIGS. 5A and 5B are diagrams that illustrate examples of the supporting post for supporting the guide shaft in the tray of a disc drive.
Figure 5B:
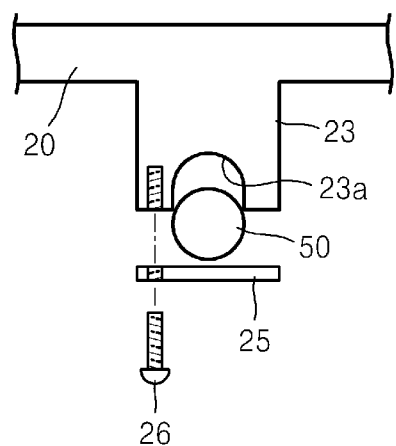
Figure 6:
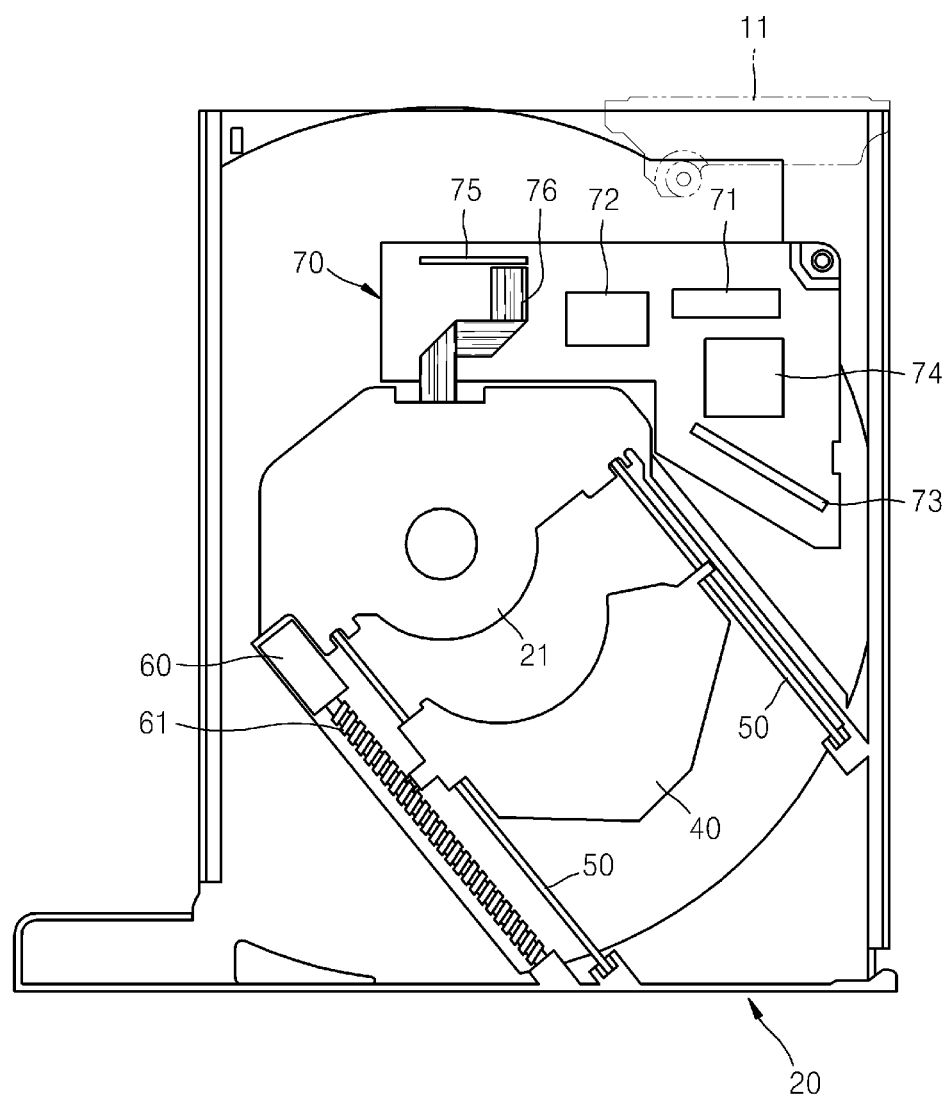
FIG. 6 is a diagram that illustrates an example of a main printed circuit board (PCB) mounted on a bottom surface of the tray in a disc drive.
Figure 7:
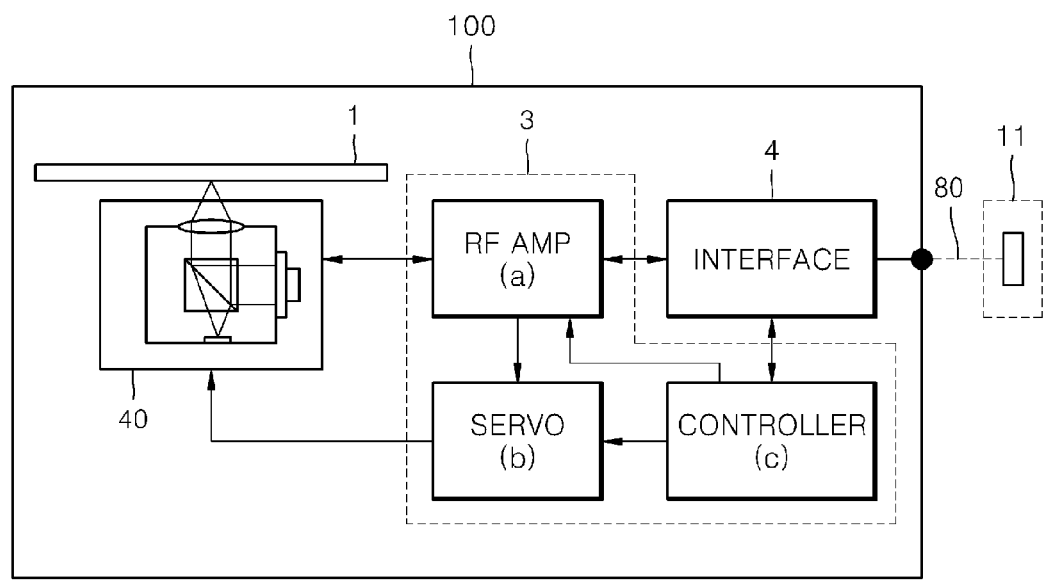
FIG. 7 is a diagram that illustrates an example of a main PCB applied in a disc drive.

As illustrated in FIG. 4, the supporting posts 23 and 24, which support both end portions of the guide shafts 50, are formed on a bottom surface of the tray 20 and on a side portion of the motor base 21. As an example, the supporting post 24 may have a penetration hole 24a, in which an end portion of the guide shaft 50 is inserted (refer to FIG. 5A). As an example, the supporting post 23 may include a saddle-type insertion recess 23a in which the shaft 50 is inserted from a lower portion (refer to FIG. 5B). In addition, as an example, the supporting post 23 may have an additional supporting member 25 operatively coupled there to, such that the additional supporting member 25 prevents the guide shaft 50 from being inadvertently removed from the insertion recess 23a. For example, the additional supporting member 25 may be operatively coupled to the supporting post 23 by means of a screw 26. FIG. 6 is diagram illustrating an example of a bottom surface of the tray 20 without the optical pickup and the guide shafts in a disc drive. FIG. 7 is a diagram illustrating an example of a main PCB 70.

Referring to FIGS. 6 and 7, a main printed circuit board (PCB) 70 of the disc drive 100 may be disposed on the bottom surface of the tray 20. The main PCB is a so-called a front end system that includes a radio frequency (RF) amplifier, a servo circuit, and an interface. The main PCB may include an output interface connector 71, a connector 73 that is connected to the optical pickup, chipsets 72 and 74 of a microcomputer, and a connector 75 that is connected to the spindle motor.

As an example of the front end system, a front-end system 3 includes an RF amplifier (a), a servo unit (b) that controls tracking and focusing mechanisms of the optical pickup 40, and a system controller (c) that controls the RF amplifier (a) and the servo unit (b). As an example, a current/voltage amplifier may be disposed on a front portion of the RF amplifier in the front-end system 3. The RF amplifier (a) may output, for example, raw data (e.g., a signal) that is obtained by amplifying an RF signal. The RF amplifier may output the signal to a master device, for example, a laptop computer, through an interface 4.

As described above, if the main PCB 70 is mounted on the bottom surface of the tray 20, it is not necessary for the housing 10 to have a conventional interface device. In other words, the housing may simply include a connector for interface. As an example, the connecting may include a serial advanced technology attachment (SATA) connector.

Figure 8:
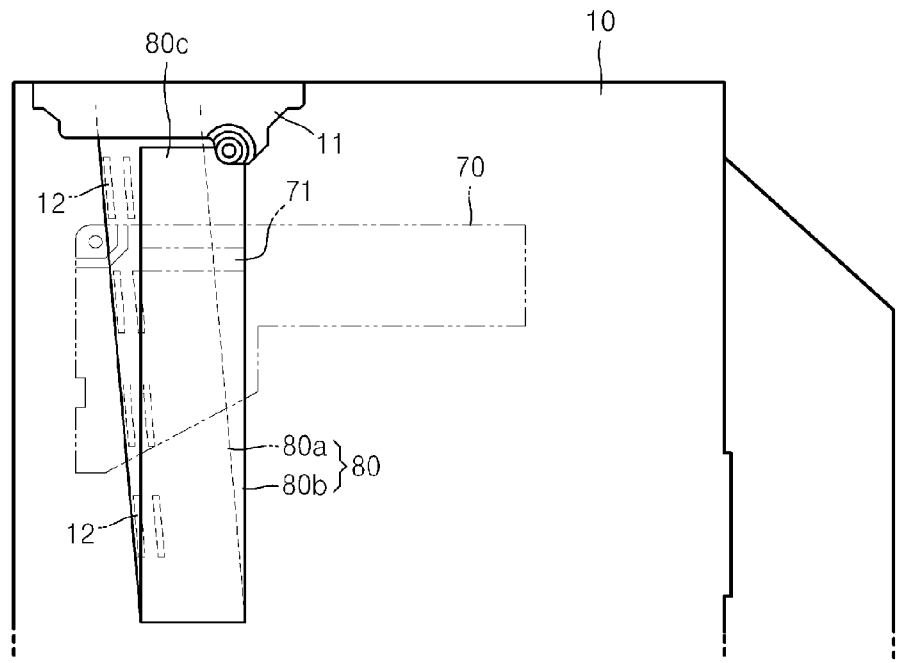
FIG. 8 is a diagram that illustrates examples of arrangements of cables that are configured to output signals and that are installed on a housing base in a disc drive.

FIG. 8 is a diagram illustrating an example of an output interface connector 11 operatively installed on a housing 10. For example, the output interface connector 11 is disposed on a rear end of the base 10. As an example, the output interface connector 11 may be disposed at a side of the base 10a. A cable 80 may be connected to the output interface connector 71 disposed in the tray 20. For example, the cable 80 may be a ribbon cable. The cable 80 may be a flexible film cable (FFC). The cable 80 includes a fixed portion 80a facing the housing 10 and a movable portion 80b that is movable in response to movement of the tray 20 as is opened and closed (e.g., as a drawer). The movable portion 80b of the cable may be positioned so as to overlap the fixed portion 80a. A front edge portion of the movable portion 80b is coupled to the (output interface) connector 71 that is formed on the tray 20. The fixed portion 80a and the movable portion 80b are disposed so as not to be in parallel with each other. For example, the movable portion 80b may be disposed relative to the fixed portion 80a such that the movable portion 80b and the fixed portion 80a make a V-shape. Accordingly, the same signal lines in the fixed portion 80a and the movable portion 80b may not overlap each other. Thus, interference between the signals transmitted by the signal lines in the fixed portion 80a and the signals transmitted by the signal lines in the movable portion 80b that is caused by, for example, overlapping signal lines, is reduced. As an example, the fixed portion 80a and the movable portion 80b are formed to partially overlap each other so as to reduce signal interference. An abnormal twist of the movable portion 80b with respect to the movement of the tray 20 may be inhibited or otherwise prevented by arranging the movable portion 80b in parallel with the direction along which the tray 20 moves.

Figure 9:
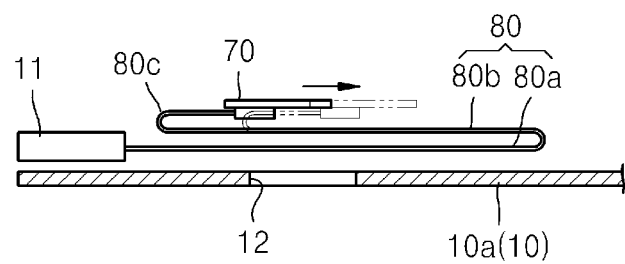
FIG. 9 is a diagram that illustrates an example of vertical arrangements of a cable.

FIG. 9 is a diagram that illustrates an example of a cable 80 in a folded state.

As an example, the cable 80 may be folded twice. The fixed portion 80a located at the lowermost portion is fixed on the bottom base 10a of the housing 10, and the movable portion 80b above the fixed portion 80b has a 'U'-shape that includes a bending portion 80c. As an example, the ribbon cable 80 may have a non-linear shape due to the fixed portion 80a, the movable portion 80b, and the bent portion 80c. In response to the main PCB 70 being moved as the tray 20 is moved, the location of the bending portion 80c varies in the movable portion 80b.

Figure 10:
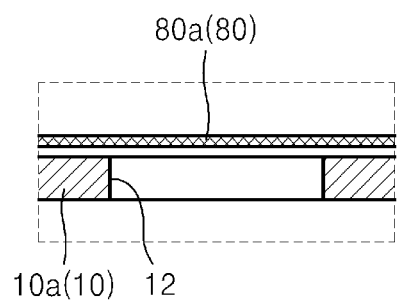
FIG. 10 is a diagram that illustrates an example of a penetration hole formed in a bottom of a housing for preventing a capacitive coupling between the housing and the cable, in a disc drive.

As an example as shown in FIGS. 8, 9, and 10, a plurality of penetration holes 12 that penetrate through a bottom of the housing base 10a may be formed in a bottom portion of the fixed portion 80a of the cable 80. The penetration holes 12 prevent the capacitive coupling between, for example, the base 10a that corresponds to a side of the body of the housing 10 and the cable 80. Therefore, the signal distortion or signal interference caused by the capacitive coupling between the cable 80 and the housing base 10a may be reduced or prevented completely. The cable 80 may include a plurality of wire layers, among which a wire layer for outputting the RF signal exists. The penetration holes 12 are formed along a certain wire layer, for example, may be formed to correspond to a wire layer through which data signals flow. For example, in a cable of SATA standard, there are differential signal lines of A+, A−, B+, and B−. As an example, the penetration holes 12 may be formed so as to correspond to a location substantially aligned with lines B− and B+ that transfer signals to a host. The capacitive coupling between a certain data line and the housing body may be reduced, and accordingly, the signal degradation such as the signal interference and the signal distortion may be reduced.

The guide shafts 50 that guide the conveyance of the optical pickup may be installed in the tray 20 such that the optical pickup may be directly mounted on the tray 20. Therefore, the number of components and the fabrication process necessary for manufacturing a disk drive may be reduced. Accordingly, the fabrication costs of the disc drive may be reduced. The structure in which the main PCB 70 is fixed on the tray 20 simplifies the housing base. In addition, because principal parts of the disc drive are concentrated on the tray 20, loads of fabricating and assembling the housing may be reduced. For example, because the wires between the optical pickup and the main PCB 70 may be reduced, signal loss or distortion may be prevented. In addition, by forming the penetration holes on the portion where the housing body and the cable contact each other, the capacitive coupling between the housing body and the cable may be prevented. Therefore, the signal interference or the signal distortion may be prevented.

In some aspects, there is provided a disc drive (e.g., an optical disc drive) that prevents capacitive coupling between internal components. For example, in some aspects, there is provided an optical disc drive that inhibits or otherwise prevents capacitive coupling between an internal cable and a base. In these aspects, the degradation of quality of signals in the cable is reduced.

In some aspects, there is provided an optical disc in which the number of components is reduced. Accordingly, fabricating processes fabrication costs are reduced.

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication consistent with that disclosed herein.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc drive comprising:
    a tray;
    a housing configured to receive the tray;
    a pickup that is operatively coupled to the tray;
    a connector installed on the housing configured to output signals obtained from the pickup;
    a cable, comprising a first end which is connected to the connector, a part installed adjacent to a side of a body of the housing, wire layers which transmit signals to a host, and wire layers which receive signals from the host; and
    penetration holes formed in a side of the body of the housing so as to reduce a capacitive coupling between the cable and the body of the housing,
    wherein the penetration holes are directly aligned with the wire layers which transmit signals to the host, and none of the penetration holes are aligned with the wire layers which receive signals from the host; and
    the penetration holes are arranged diagonally and periodically throughout an entire region of the housing, the region consisting of areas where the cable is in contact with the housing.

2. The disc drive of claim 1, wherein
    a main printed circuit board (PCB) is installed on the tray, and
    the cable comprises a second end which is connected to the main PCB.

3. The disc drive of claim 2, wherein guide shafts, on which the pickup is installed to reciprocate, are installed on the tray, and supporting posts configured to support the guide shafts protrude from the tray.

4. The disc drive of claim 1, wherein guide shafts, on which the optical pickup is installed to reciprocate, are installed on the tray, and supporting posts configured to support the guide shafts protrude from the tray.

5. The disc drive of claim 1, wherein
    the cable comprises a fixed portion and a movable portion that is bent from the fixed portion; and
    the movable portion partially overlaps the fixed portion such that the movable portion is not parallel with the fixed portion.

6. The disc drive of claim 5, wherein the movable portion is disposed in parallel with a direction in which the tray moves.

7. The disc drive of claim 1, wherein the cable is a ribbon cable.

8. An electronic device, the electronic device comprising the disc drive of claim 1.

9. The electronic device of claim 8, wherein the electronic device is one of a portable game console, a portable/personal multimedia player (PMP), a portable lap-top PC, a desktop PC, a high definition television (HDTV), an optical disc player, and an optical disc recorder.

10. The disc drive of claim 1, wherein
    the cable is an SATA cable; and
    the wire layers which transmit signals to the host are B− and B+ wire layers, and the wire layers which receive signals from the host are A− and A+ wire layers.

11. The disc drive of claim 1, wherein
    the cable comprises a fixed portion and a movable portion that is bent from the fixed portion; and
    the movable portion is deposed relative to the fixed portion such that the movable portion and the fixed portion make a V-shape in order to reduce interference between signals transmitted by signal lines in the fixed portion and signals transmitted by signal lines in the movable portion.

12. A disc drive comprising:
    a tray;
    a housing comprising a base and a cover, the housing configured to receive the tray;
    a pickup mounted on the tray;
    a spindle motor mounted on the tray such that a rotary shaft of the spindle motor is fixed on the tray;
    a cable, comprising wire layers which transmit signals to a host and wire layers which receive signals from the host, and that is installed between the base of the housing and the tray; and
    penetration holes formed in the base of the housing so as to reduce a capacitive coupling between the cable and the base of the housing,
    wherein the penetration holes are directly aligned with the wire layers which transmit signals to the host, and none of the penetration holes are aligned with the wire layers which receive signals from the host; and
    the penetration holes are arranged diagonally and periodically throughout an entire region of the housing, the region consisting of areas where the cable is in contact with the housing.

13. The disc drive of claim 12, wherein
    the cable comprises a fixed portion and a movable portion that is bent from the fixed portion; and
    the fixed portion is disposed to face the penetration hole.

14. The disc drive of claim 13, wherein the movable portion partially overlaps with the fixed portion such that the movable portion is not parallel with the fixed portion.

15. The disc drive of claim 14, wherein the movable portion is disposed in parallel with a direction in which the tray moves.

16. The disc drive of claim 12, wherein the cable is a ribbon cable.

17. An electronic device, the electronic device comprising the disc drive of claim 12.

18. The electronic device of claim 17, wherein the electronic device is one of a portable game console, a portable/personal multimedia player (PMP), a portable lap-top PC, a desktop PC, a high definition television (HDTV), an optical disc player, and an optical disc recorder.

19. A housing for a disc drive, the housing comprising:

a base to which a disc tray is coupled as a drawer type;

a cover configured to protect a disc that is mounted on the disc tray; and penetration holes formed in the base for reducing a capacitive coupling between a cable, comprising wire layers for transmitting signals to a host and wire layers for receiving signals from the host, and the base, wherein the penetration holes are directly aligned with the wire layers which transmit signals to the host, and none of the penetration holes are aligned with the wire layers which receive signals from the host; and the penetration holes are arranged diagonally and periodically throughout an entire region of the housing, the region consisting of areas where the cable is in contact with the housing.

20. The housing of claim 19, wherein a connector to which the cable is operatively connected is formed on the base.

21. The housing of claim 20, wherein the cable comprises a fixed portion and a movable portion bent from the fixed portion; and the fixed portion is disposed to face the penetration hole.

22. The housing of claim 19, wherein a plurality of the penetration holes are formed along a certain wire layer in the cable.

23. The housing of claim 22, wherein the cable comprises a fixed portion and a movable portion bent from the fixed portion; and the fixed portion is disposed to face the penetration hole.

* * * * *